US006200536B1

(12) United States Patent
Tonkovich et al.

(10) Patent No.: US 6,200,536 B1
(45) Date of Patent: Mar. 13, 2001

(54) ACTIVE MICROCHANNEL HEAT EXCHANGER

(75) Inventors: Anna Lee Y. Tonkovich, Pasco; Gary L. Roberts, West Richland; Charles J. Call, Pasco; Robert S. Wegeng; Yong Wang, both of Richland, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 08/883,643

(22) Filed: Jun. 26, 1997

(51) Int. Cl.[7] .............................. B01D 53/34; F01N 3/00; F01N 3/10; F28F 3/00
(52) U.S. Cl. ...................... 422/177; 422/168; 422/173; 165/167
(58) Field of Search .................................. 422/198, 173, 422/177–181, 129, 168, 200; 165/167, 166, DIG. 356, DIG. 364

(56) References Cited

U.S. PATENT DOCUMENTS

| 5,270,127 | * | 12/1993 | Koga et al. ............................ 429/17 |
| 5,534,328 | * | 7/1996 | Ashmead et al. ..................... 428/166 |
| 5,639,401 | * | 6/1997 | Jacobs et al. ......................... 252/373 |
| 5,811,062 | * | 9/1998 | Wegeng et al. ....................... 422/129 |
| 5,836,383 | * | 11/1998 | Zwittig ................................. 165/167 |

FOREIGN PATENT DOCUMENTS

| 39 26 466 | 2/1991 | (DE) . |
| 195 39 648 A1 | 5/1997 | (DE) . |
| 0 308 976 | 9/1988 | (EP) . |
| PCT/US94/02845 | 9/1994 | (WO) . |
| PCT US95 08011 | 2/1996 | (WO) . |
| PCT/US96/16546 | 4/1997 | (WO) . |

* cited by examiner

Primary Examiner—Shrive Beck
Assistant Examiner—Alexa A. Doroshenk
(74) Attorney, Agent, or Firm—Paul W. Zimmerman (57) ABSTRACT

The present invention is an active microchannel heat exchanger with an active heat source and with microchannel architecture. The active microchannel heat exchanger has (a) an exothermic reaction chamber; (b) an exhaust chamber; and (c) a heat exchanger chamber in thermal contact with the exhaust chamber, wherein (d) heat from the exothermic reaction chamber is convected by an exothermic reaction exhaust through the exhaust chamber and by conduction through a containment wall to the working fluid in the heat exchanger chamber thereby raising a temperature of the working fluid. The invention is particularly useful as a liquid fuel vaporizer and/or a steam generator for fuel cell power systems, and as a heat source for sustaining endothermic chemical reactions and initiating exothermic reactions.

37 Claims, 6 Drawing Sheets

ACTIVE MICROCHANNEL HEAT EXCHANGER

This invention was made with Government support under Contract DE-AC06 76RLO 1830 awarded by the U.S. Department of Energy. The Government has certain rights in the invention.

FIELD OF THE INVENTION

The present invention relates generally to an active microchannel heat exchanger. As used herein, the term "active" means that there is an exothermic reaction chamber as a source of heat. Further, as used herein, the term "microchannel" is a groove with a maximum depth of 10 mm and a maximum width of 1 mm and any length.

BACKGROUND OF THE INVENTION

Process heating is necessary in many industries from electric power production to food canning. Because heating is often ancillary, recovery of waste heat is often beneficial and economical. However, waste heat is often low temperature that is difficult to recover and use.

Fuel cells have been researched for years as a promising alternative to internal combustion engines for automotive transportation. One of the practical limitations of fuel cells is the necessity of providing hydrogen to the fuel cells. It has been proposed that liquid hydrocarbon fuel be processed on board to produce hydrogen to avoid the need for storage of hydrogen. Hydrogen is obtained from hydrocarbon liquid fuel by reforming and/or by partial oxidation. Because both of these are gas phase reactions, it is necessary to vaporize the liquid fuel prior to converting it to hydrogen. Because fuel cells have an exhaust that includes unburned hydrogen, the exhaust provides an opportunity to provide heat for the vaporization of fuel. In certain fuel cell systems, steam may be needed for steam reforming and/or water shift reacting.

Accordingly, there is a need for a small, lightweight and efficient active microchannel heat exchanger, especially for use in a fuel cell power system as a fuel vaporizer and/or as a steam generator.

Further, in chemical processes, many reactions are endothermic, requiring a source of heat to sustain the endothermic reactions. Also in chemical processes, exothermic reactions often require initial heating to initiate the exothermic reaction(s). Accordingly, there is a need for a small, lightweight and efficient active microchannel heat exchanger especially for use in chemical processes.

SUMMARY OF THE INVENTION

The present invention is an active microchannel heat exchanger with an active heat source and with microchannel architecture. The active microchannel heat exchanger has:

(a) an exothermic reaction chamber having a first shell defining an exothermic reactant flow path and exhaust flow path, the first shell penetrated with at least one inlet, and an exhaust outlet;

(b) an exhaust chamber having a second shell with a containment wall defining an exhaust flow path connected to said exhaust outlet, said second shell penetrated by an exhaust chamber outlet, the exhaust chamber having microchannels through which an exhaust flows; and (c) a heat exchanger chamber in thermal contact with the exhaust chamber, said heat exchanger chamber having a third shell defining a working fluid flow path and having a third exterior surface penetrated by a working fluid inlet and a working fluid outlet through which a working fluid flows; wherein (d) heat from the exothermic reaction chamber is convected by an exothermic reaction exhaust through the exhaust chamber and by conduction through the containment wall to the working fluid in the heat exchanger chamber thereby raising a temperature of the working fluid.

The invention is particularly useful as a liquid fuel vaporizer and/or a steam generator for fuel cell power systems, and as a heat source for sustaining endothermic chemical reactions and initiating exothermic reactions.

It is an object of the present invention to provide an active microchannel heat exchanger for heating a working fluid.

It is an object of the present invention to provide a working fluid vaporizer.

It is a further object of the present invention to provide a fuel vaporizer for a fuel cell power system.

It is a further object of the present invention to provide a steam generator for a fuel cell power system.

It is another object of the present invention to provide a methanizer.

It is yet another object of the present invention to provide a chemical process reaction heat source.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

According to the present invention, working fluids that may receive heat may be gas or liquid. Further, liquid may undergo a phase change. Yet further, a liquid or gas may undergo a chemical change. Preferred fluids to be vaporized include but are not limited to liquid fuels and water. Liquid fuels include but are not limited to alcohols ($CH_3OH$ methanol, $C_2H_5OH$ ethanol), gasoline, diesel, and combinations thereof. Preferred fluids to be chemically converted include but are not limited to carbon dioxide, carbon monoxide and hydrogen.

Referring to FIGS. 1a, 1b, 2a and 2b, the active microchannel heat exchanger of the present invention has (a) an exothermic reaction chamber 100 having a first shell 102 defining an exothermic reactant flow path and exhaust flow path, the first shell 102 penetrated with at least one inlet 104, and an exhaust outlet 106;

(b) an exhaust chamber 108 having a second shell 110 with a containment wall 111 defining an exhaust flow path connected to said exhaust outlet 106, said second shell 110 penetrated by an exhaust chamber outlet 112, the exhaust chamber 108 further having microchannels through which the exhaust flows; and (c) a heat exchanger chamber 114 in thermal contact with the exhaust chamber, the heat exchanger chamber 114 having a third shell 116 defining a working fluid flow path and having a third exterior 118 surface penetrated by a working fluid inlet 120 and a working fluid outlet 122 through which a working fluid flows; wherein (d) heat from the exothermic reaction chamber 100 is convected by an exothermic reaction exhaust through the exhaust chamber 108 and by conduction through the containment wall 111 to the working fluid in the heat exchanger chamber 114 thereby raising a temperature of the working fluid.

Figure 1A:
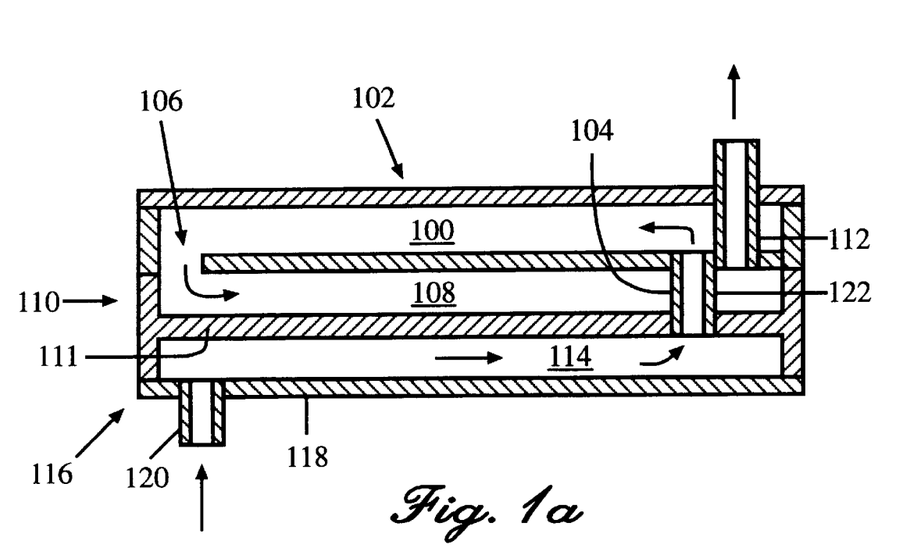
FIG. 1a is a cross section of a single pass active microchannel heat exchanger with an exhaust chamber between an exothermic reaction chamber and a working fluid chamber.
Figure 1B:
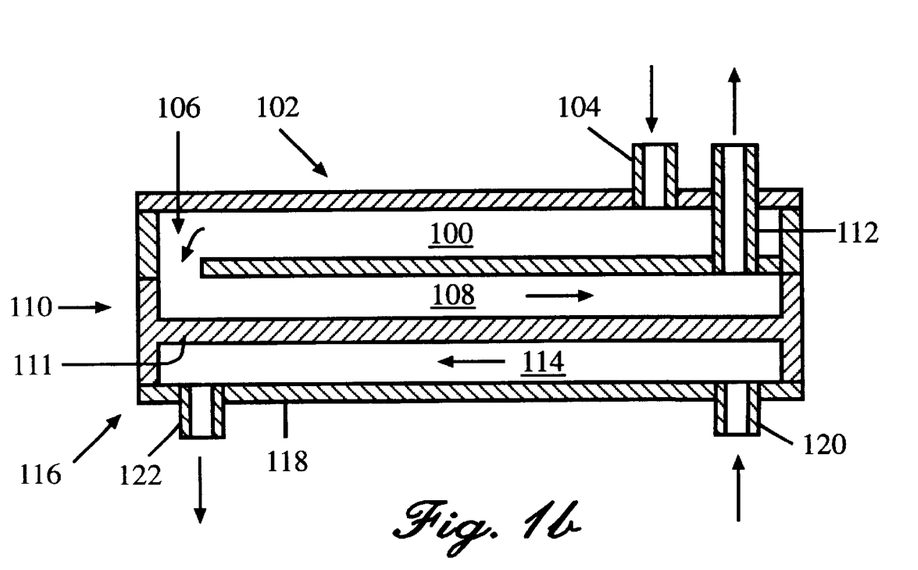
FIG. 1b is a cross section of a dual pass active microchannel heat exchanger with an exhaust chamber between an exothermic reaction chamber and a working fluid chamber.

With working fluid flowing through the heat exchanger chamber 114, the active microchannel heat exchanger may function as a methanizer (Sebatier process) as shown in FIG. 1a or other chemical process, or as a fuel vaporizer with fuel passing through the heat exchanger chamber 114, or as a steam generator with water passing through the heat exchanger chamber 114 as in FIG. 1b. For improved heat transfer, it is preferred that the heat exchanger chamber 114 contain microchannels.

Figure 2A:
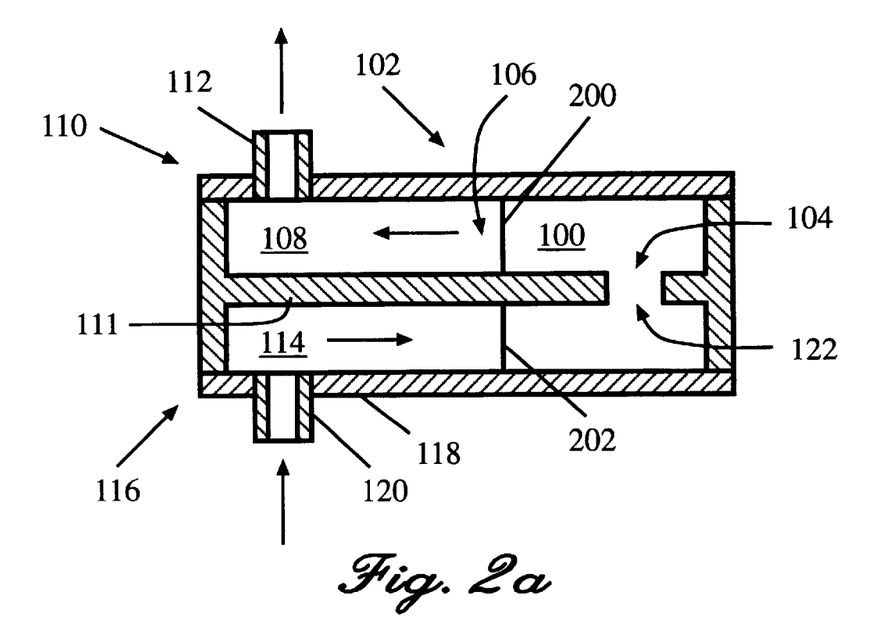
FIG. 2a is a cross section of a single pass active microchannel heat exchanger with the exhaust chamber in thermal contact with the heat exchanger chamber.
Figure 2B:
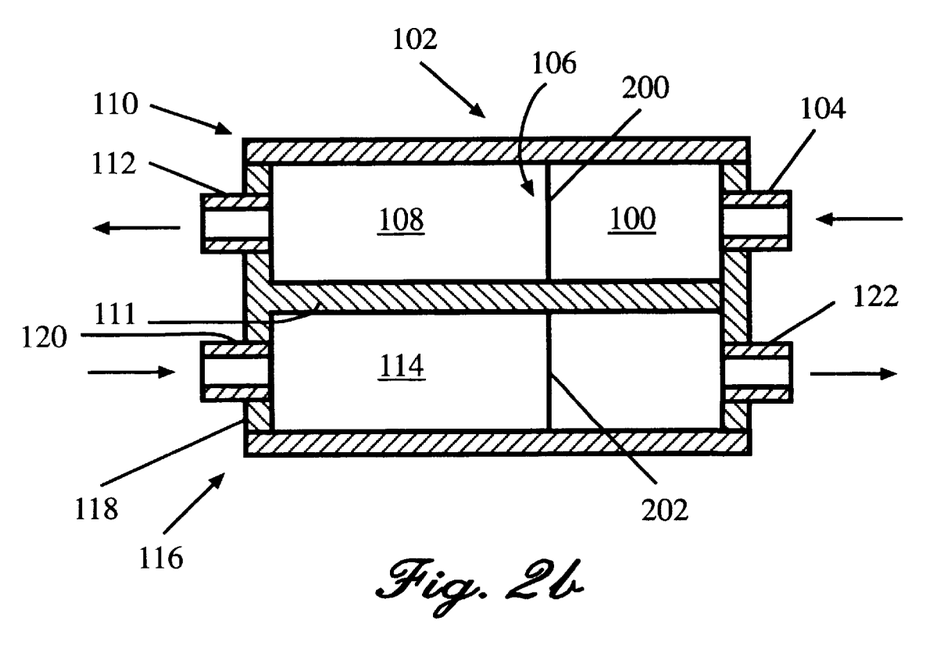
FIG. 2b is a cross section of a dual pass active microchannel heat exchanger with the exhaust chamber in thermal contact with the heat exchanger chamber.

The active microchannel heat exchanger in FIG. 1a is a single pass active microchannel heat exchanger wherein the working fluid is also the exothermic reactant and the working fluid outlet 122 is a fluid communication connection between the heat exchanger chamber 114 and the exothermic reaction chamber 100. The active microchannel heat exchanger in FIG. 1b is a dual pass active microchannel heat exchanger wherein the working fluid is separate from the exothermic reactant. Inlets and outlets may penetrate the top and bottom as shown, or may penetrate the sides as needed for an assembly. An alternative arrangement of exothermic reaction chamber 100 and exhaust chamber 108 is shown in FIGS. 2a and 2b wherein the exothermic reaction chamber 100 and the exhaust chamber 108 and the heat exchanger chamber 114 are formed in a single shell combining the first shell 102 with the second shell 110. In FIGS. 2a and 2b, the exothermic reaction chamber 100 is a cavity whereas the exhaust chamber 108 has microchannels beginning at a microchannel edge 200.

Further shown in FIG. 2a is the heat exchanger chamber 114 defined by the third shell 116. It is preferred that the heat exchanger chamber 114 contain microchannnels as described above. A second microchannel edge 202 defines the termination of microchannels in the heat exchanger chamber 114.

It is critical to the present invention that heat removal from the exothermic reaction chamber 100 be controlled. Excess heat removal quenches the exothermic reaction. Accordingly, for simple working fluid heating or vaporization, it is preferred that the exothermic reaction be adiabatic or near adiabatic. For chemical reactions, including methanization, it is preferred that the exothermic reaction be isothermal or near isothermal.

In FIG. 1a, the exhaust chamber 108 is placed between the exothermic reaction chamber 100 and the heat exchanger chamber 114. Alternatively (not shown), the heat exchanger chamber 114 may be placed between the exothermic reaction chamber 100 and the exhaust chamber 108. In FIG. 2a, the exothermic reaction chamber 100 may be kept adiabatic by the termination of microchannels at the second microchannel edge 202.

Exothermic reactions useful in the exothermic reaction chamber 100 according to the present invention include but are not limited to combustion and methanization.

Figure 2C:
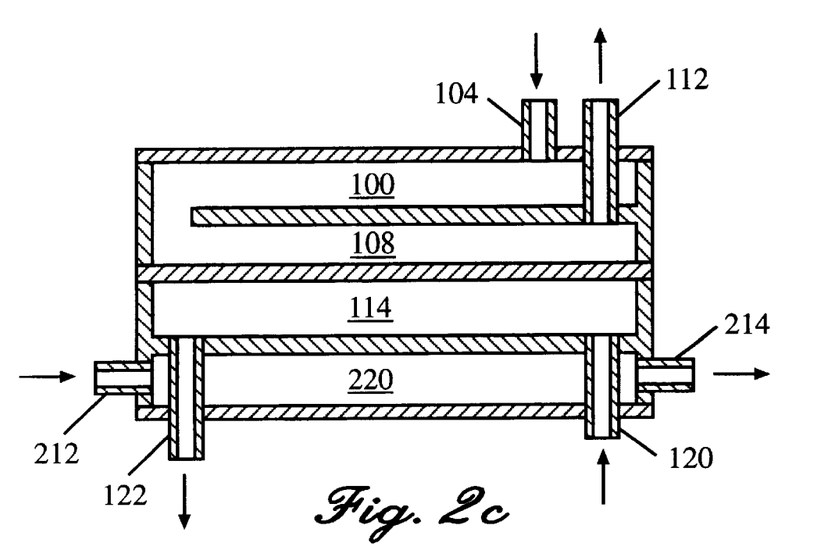
FIG. 2c is a cross section of a dual pass active microchannel heat exchanger wherein the chamber 114 is a second reaction chamber that is in thermal contact with a second heat exchanger chamber 220.

For endothermic reactions or exothermic reaction initiation, the heat exchanger chamber 114 preferably lacks microchannels so that the third shell 116 is the heat exchanger chamber boundary, so that the heat exchanger chamber 114 is now a process reaction chamber 114. Recognizing that once a process exothermic reaction is initiated within the process reaction chamber 114, the heat provided from the exothermic reaction chamber 100 is no longer needed. Moreover, it may be necessary to remove heat from a process exothermic reaction. Alternatively, the process reaction may be endothermic requiring heat input. In cases where the process reaction heat transfer is "mild", it may be possible to provide sufficient heat transfer by using an inert gas passed through the exothermic reaction chamber 100 and exhaust chamber 108. Use of an inert gas is preferred to avoid any degrading of any additional material, for example catalyst material, that may be present in the exothermic reaction chamber 100. It may be necessary to add a second heat transfer chamber 210 with second heat transfer chamber inlet 212 and outlet 214 as shown in FIG. 2c. The outlet 122 may be input to a second reaction chamber (not shown) for further processing.

Figure 2D:
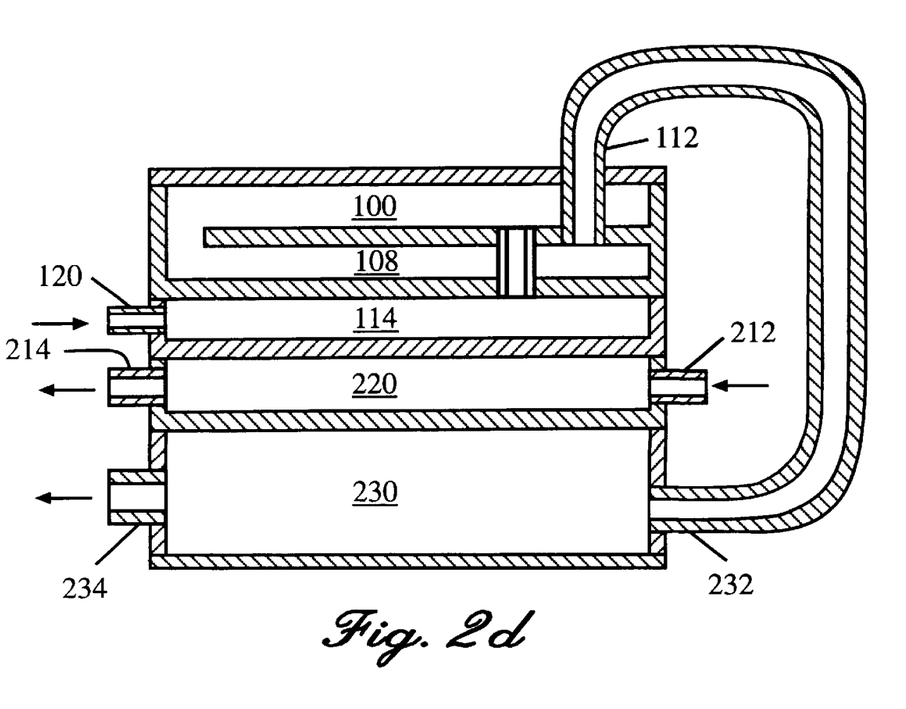
FIG. 2d is a cross section of an active microchannel heat exchanger having a first and second reaction chamber and first and second heat exchanger chambers.

In a single pass system, for example the methanizer, reaction thermodynamics may dictate the need for a second, perhaps cooler, reaction chamber. FIG. 2d shows a single pass system with the second reaction chamber 230 that can be connected to the exhaust outlet 112 externally, as shown, or internally to a second reaction chamber inlet 232 and thence to a second reaction chamber outlet 234. In a methanizer, the second reaction chamber 230 is operated at a lower temperature more favorable to reaction kinetics toward completion of the methanization reaction. A second heat transfer chamber 220 may be employed for temperature control or heat transfer.

Figure 3A:
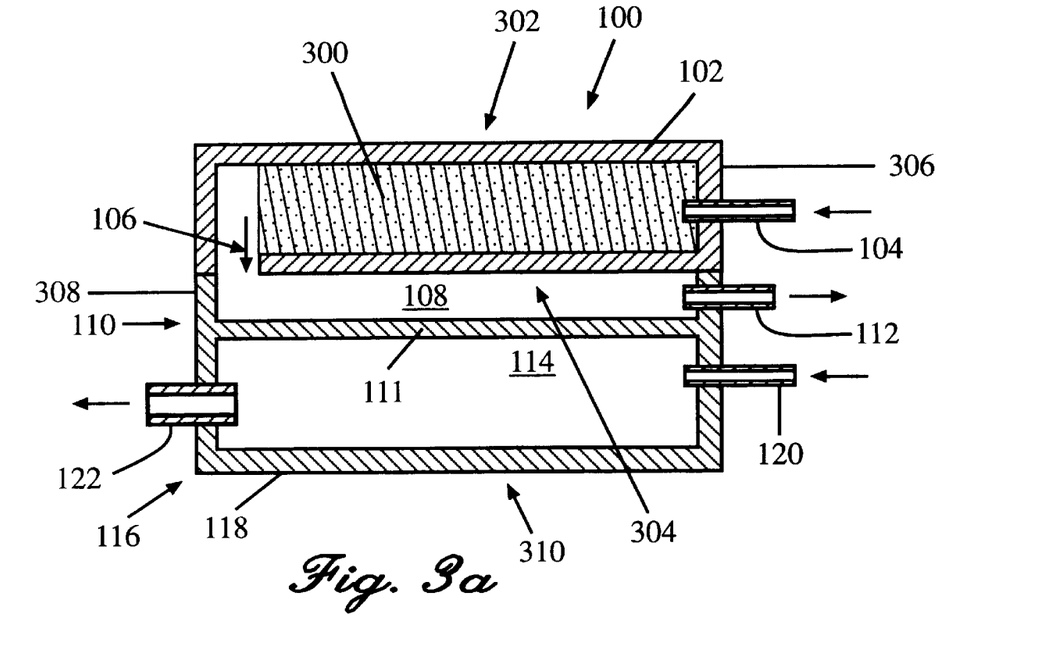
FIG. 3a is similar to FIG. 1b but with a porous material in the exothermic reaction chamber.
Figure 3B:
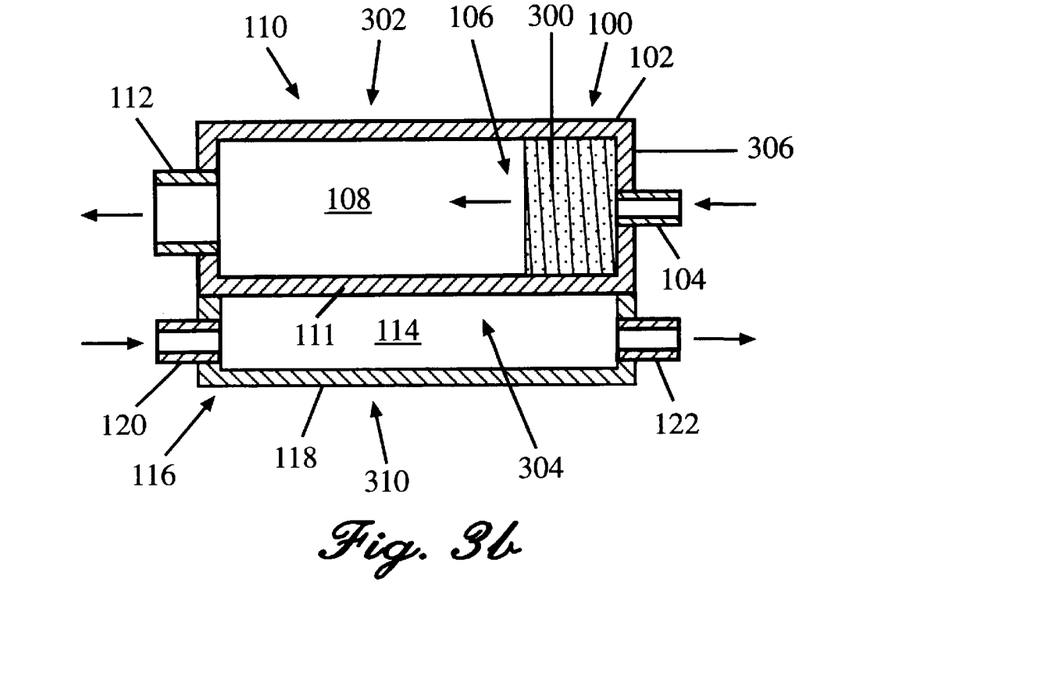
FIG. 3b is similar to FIG. 2b but with a porous material in the exothermic reaction chamber.

In applications wherein it is advantageous, a porous material 300 may be placed in the exothermic reaction chamber 100 as shown in FIGS. 3a, and 3b. The pores may be any size, and in applications wherein pore size may be used to advantage in avoiding a flame for a combustion, it is preferred that pores be of a size less than a mean free path of a combustion fuel gas phase molecule. At 600 K, the mean free path of a typical gas molecule is about 10 micrometers. In a preferred embodiment, pore size distribution is about 0.001–10 micrometer where the specific pore size distribution is determined based upon optimal transport, surface area per unit volume, and reaction rate. The porous material is selected from the group of ceramic, for example alumina, zirconia, titania, silica, and magnesium oxide and porous metal and may be supplemented with a catalyst coating. Porous metal and/or metal for structural walls may be selected from aluminum, stainless steel, copper, nickel and nickel based alloys. Where the porous material is non-catalytic for the exothermic reaction, the porous material acts as a support for a catalyst selected from the group of palladium, gold, silver, platinum, ruthenium, rhodium, rhenium, indium, nickel, tin, copper, zirconium and combinations thereof. The porous material may, itself, be made of a catalyst material and require no further catalyst. The catalyst may be in the form of a coating. By having the pore size less than the mean free path of a gas phase molecule, there is no flame for combustion.

Figure 4:
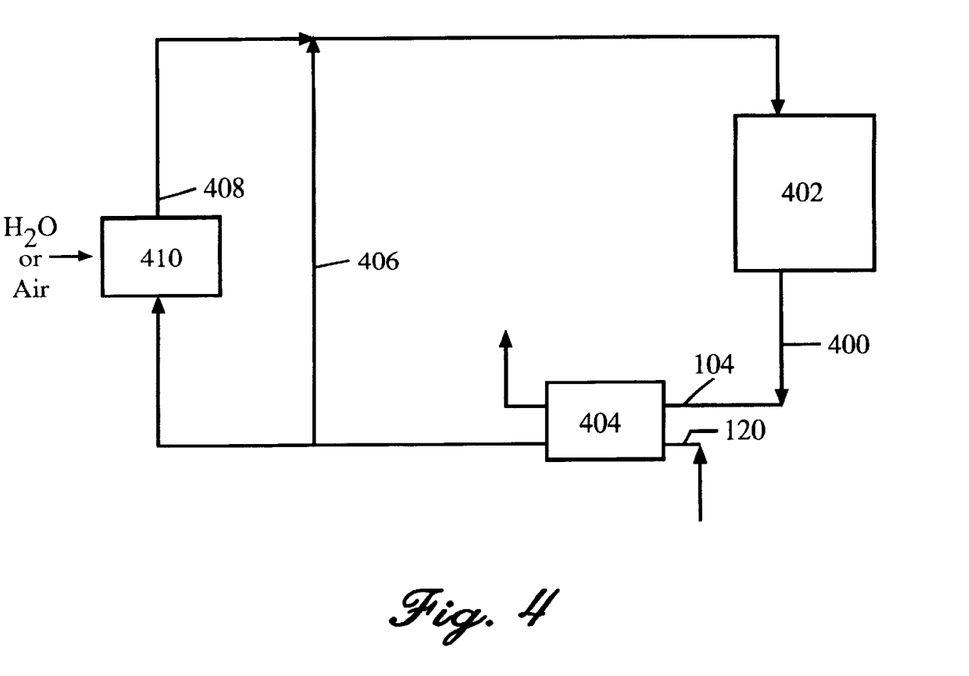
FIG. 4 is a block diagram of a fuel cell power system connected to an active microchannel fuel vaporizer.

The dual pass embodiment of the present invention is particularly useful in combination with a combustion fuel, preferably dilute hydrogen in an effluent stream, for example from an anode effluent 400 of a fuel cell 402 (FIG. 4) or a petrochemical processing stream. The amount of hydrogen in a dilute stream varies from about 3 mol % to about 12 mol % most typically from about 6 mol % to about 8 mol %. The dilute hydrogen is introduced into the fuel vaporizer of the present invention 404 through the inlet 104. Oxidizer, including but not limited to oxygen, may be included with the dilute hydrogen, or introduced through an oxidizer inlet (not shown). Vaporized fuel may be returned directly to the fuel cell 402 if the fuel cell 402 is hydrocarbon operated via return line 406, or via reformed return line 408 from a fuel reformer 410 if the fuel cell 402 is hydrogen operated. The fuel reformer 410 may contain a partial oxidation reactor, a water gas shift reactor, a preferential oxidation reactor and combinations thereof.

The single pass embodiment of the present invention is particularly useful in a Sebatier process (methanizer) that converts carbon dioxide and hydrogen to methane and water.

In all embodiments, it is preferred that the overall active microchannel heat exchanger is compact. An external chamber aspect ratio may be defined as the ratio of a characteristic dimension (length, width, diagonal or diameter) of the first top 302 (FIG. 3a, 3b) and/or first bottom 304 to a characteristic dimension (distance from the first top 302 to the first bottom 304) of the first sides 306 is greater than about two, preferably greater than about 5. It is preferred that the external chamber high aspect ratio be about 8 to about 40.

Further, as shown in FIG. 3a, 3b, the second shell 110 preferably is rectangular having a high aspect ratio having a second top which is either the same as the first bottom 304, or is separate from the first bottom 304 but in contact with a substantial fraction of the first bottom 304. The second shell 110 further has a second bottom (containment wall) 111 of large surface area and second sides 308 of small surface area and penetrated by the exhaust outlet 112. In a preferred embodiment, the second bottom 111 has longitudinal grooves or microchannels (not shown) to improve heat transfer from the exhaust into the containment wall 111. It is most preferred that the longitudinal grooves be defined by microchannel walls extending from the second bottom 111 to the first bottom 304 (also second top).

Finally, in FIG. 3a, 3b, the third shell 116 is rectangular having a high aspect ratio defined by a third top (second bottom or containment wall) 111 and a third bottom 310 of large surface area and third sides of small surface area, futher having second microchannel walls. Again, it is preferred that the second microchannels are defined by the second microchannel walls extending from the third top 111 to the third bottom 310. In all embodiments shown and described, (FIGS. 1a, 1b, 2a, 2b, 3a, 3b), in the exhaust chamber 108, it is preferred that the microchannels are defined by microchannel walls extending from the first bottom 304 to the third top 111. Similarly for microchannels in the heat exchanger chamber 114.

Figure 5A:
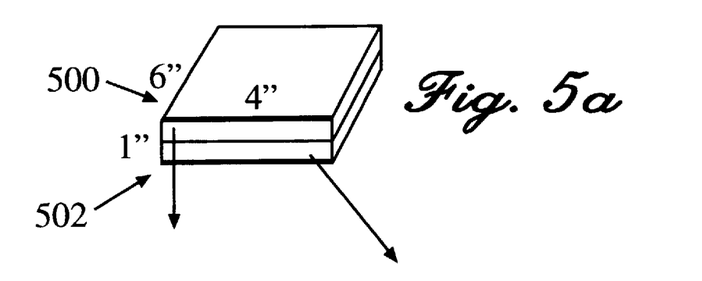
FIG. 5a is a scaled up active microchannel heat exchanger.
Figure 5B:
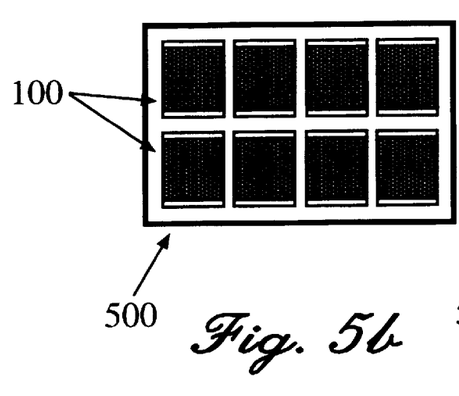
FIG. 5b is a magnified partial view of FIG. 5a showing an exothermic reaction plate.
Figure 5C:
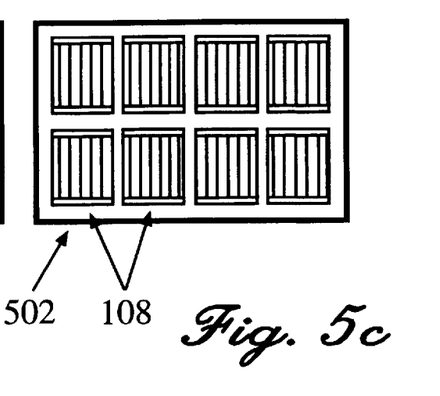
FIG. 5c is a magnified partial view of FIG. 5a showing a heat exchanger plate.

For scaling up to larger units, it is preferred to have excess capacity so that spent catalyst and/or fouled microchannels may be regenerated without disabling the entire process. FIG. 5a is a preferred embodiment of an active microchannel heat exchanger having excess capacity. As shown in FIG. 5b, an exothermic reaction plate 500 has a plurality of exothermic reaction chambers 100. As shown in FIG. 5c, a heat exchanger plate 502 has a plurality of exhaust chambers 108 on a top side as shown and a plurality of heat exchanger chambers 114 on a bottom side (not shown) beneath the exhaust chambers 108.

Simply combining the exothermic reaction plate 500 with the heat exchanger plate 502 provides increased capacity compared to a single heat exchanger chamber, but does not permit regeneration without disabling the entire process.

Figure 6A:
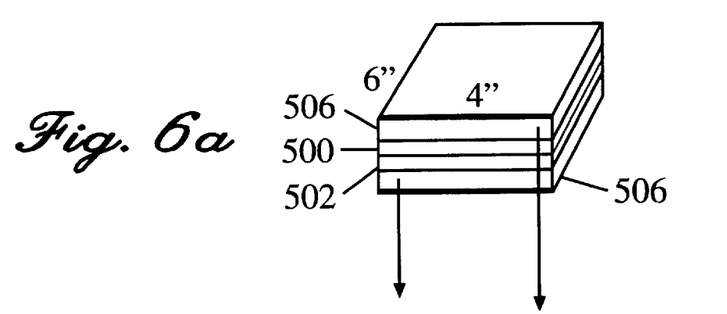
FIG. 6a is an active microchannel heat exchanger with control plates.
Figure 6B:
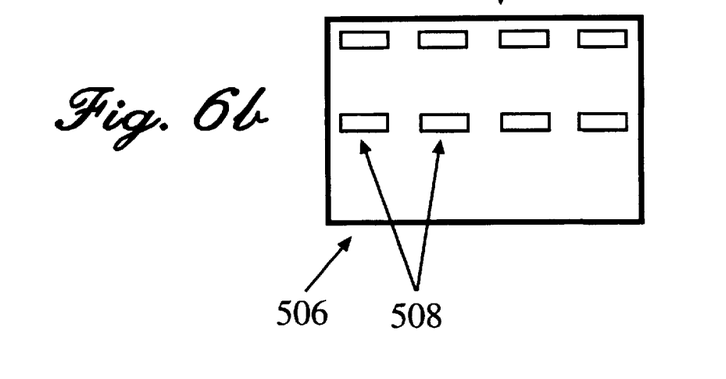
FIG. 6b is a magnified partial view of FIG. 6a showing control plates.

Accordingly, as shown in FIG. 6a–6b, control plates 506 with valves 508 and associated manifold are added that permit taking a single exothermic reaction chamber 100/ exhaust chamber 108/heat exchanger chamber 114 assembly/unit off line while the remaining assemblies/units continue operation. The valves 508 may be microvalves.

Specifically, when a fuel vaporizer is off line, the porous material 300 in the exothermic reaction chamber 100 is regenerated by anode effluent (dilute hydrogen) to reduce an oxide surface layer with heat from an organic burnout from the heat exchanger chamber 114. The heat exchanger chamber 114 side of the heat exchanger plate 502 may be cleaned or regenerated by using oxygen feed to burn out accumulated organics followed by flowing the working fluid without vaporizing to resolvate inorganic residue.

EXAMPLE 1

An active microchannel heat exchanger was constructed according to the embodiment in FIG. 3a. The exhaust chamber 108 contained microchannels with a width of 430 micrometer and a depth of 2000 micrometer. The heat exchanger chamber 114 contained microchannels with a width of 430 micrometer and a depth of 1500 micrometer. Microchannel walls between microchannels had a width of 430 micrometer. The exhaust chamber 108 and the heat exchanger chamber 114 had overall lengths of 2 cm and widths of 2 cm.

Dilute hydrogen at about 8 mol % was mixed with air as a fuel composition resulting in a flow rate of dilute hydrogen fuel composition at a concentration of 6.7 mol % with stoichiometric oxygen (2:1) of about 89.3 L/min. This was sufficient to heat water at a flow rate of 455 mL/min from 22 C. to 60 C.

System efficiency was 97%.

EXAMPLE 2

The active microchannel heat exchanger used in Example 1 was used to vaporize liquid water.

Flow rate of fuel composition of dilute hydrogen at a concentration of 6.7 mol % with stoichiometric oxygen (2:1) was 95.3 L/min. This was sufficient to vaporize 17.5 mL/min.

System efficiency was 73%.

EXAMPLE 3

A vaporizer to support a fuel cell power system was constructed according to the embodiment in FIG. 3a. The exhaust chamber 108 and the heat exchanger chamber 114 contained microchannels with a width of 254 micrometer and a depth of 4572 micrometer. Microchannel walls between microchannels had a width of 305 micrometer. The exhaust chamber 108 and the heat exchanger chamber 114 had overall lengths of 2 cm and widths of 5 cm. Vaporizer total volume was 61 cm$^3$.

Flow rate of fuel composition of dilute hydrogen at a concentration of 6.7 mol % with stoichiometric oxygen (2:1) was about 130 L/min. This was sufficient to vaporize 70 mL/min of methanol.

System efficiency was about 85%.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A liquid vaporizer for vaporizing a liquid, comprising:
    (a) an exothermic reaction chamber comprising a cavity without microchannels having a first shell defining a heating fuel flow path and exhaust flow path, the first shell having a first exterior surface penetrated with at least one inlet, and an exhaust outlet;
    (b) a porous material disposed within the exothermic reaction chamber wherein said porous material fills the exothermic reaction chamber from the top to the bottom of said exothermic reaction chamber;
    (c) an exhaust chamber having a second shell having top and bottom containment walls defining an exhaust flow path connected to said exhaust outlet, said second shell penetrated by an exhaust chamber outlet through which an exhaust flows, wherein microchannels in the exhaust chamber have microchannel walls that extend from the top containment wall to the bottom containment wall; and
    (d) a heat exchanger chamber having a third shell defining a liquid flow path and having a third exterior surface penetrated by a liquid inlet and a vaporized liquid outlet through which the liquid flows; wherein
    (e) the at least one inlet is connected to a fuel cell exhaust to receive a dilute hydrogen stream, and the vaporized liquid outlet is connected to a fuel cell power system fuel inlet to provide vaporized fuel to the fuel cell power system.

2. The liquid vaporizer as recited in claim 1, having a plurality of the exothermic reaction chamber on an exothermic reaction plate, having a plurality of exhaust chamber on a first side of a heat exchanger plate, having a plurality of heat exchanger chamber on a second side of the heat exchanger plate, and having a control plate with valves in fluid communication with the plurality of the exothermic reaction chambers.

3. The liquid vaporizer of claim 1 wherein said porous material comprises a porous metal selected from the group consisting of aluminum, stainless steel, copper, nickel and nickel-based alloys.

4. A chemical processor, comprising:
    (a) an exothermic reaction chamber without microchannels having a first shell defining an exothermic reactant flow path and exhaust flow path, the first shell penetrated with at least one inlet, and an exhaust outlet;
    (b) an exhaust chamber having a second shell with a containment wall defining an exhaust flow path connected to said exhaust outlet, said second shell penetrated by an exhaust chamber outlet, the exhaust chamber having microchannels through which an exhaust flows during operation and wherein said exhaust flows substantially completely through said microchannels; and
    (c) a heat exchanger chamber in thermal contact with the exhaust chamber, said heat exchanger chamber having a third shell defining a working fluid flow path containing microchannels and having a third exterior surface penetrated by a working fluid inlet and a working fluid outlet, said working fluid outlet connected to said inlet through which a working fluid flows; wherein, during operation,
    (d) wherein said heat exchanger chamber is in thermal contact with the exhaust chamber such that, during operation, heat from the exothermic reaction chamber is convected by an exothermic reaction exhaust through the exhaust chamber and by conduction through the containment wall to the working fluid in the heat exchanger chamber thereby raising a temperature of the working fluid; and
    (e) a porous material disposed within the exothermic reaction chamber wherein said porous material fills the exothermic reaction chamber from the top to the bottom of said exothermic reaction chamber.

5. The chemical processor of claim 4, wherein said exhaust chamber comprises microchannels defined by microchannel walls that extend from the bottom of the exhaust chamber to the top; wherein, during operation, a working fluid flows through said microchannels in the exhaust chamber.

6. The chemical processor of claim 5, further comprising a second heat exchanger chamber in thermal contact with the heat exchanger chamber.

7. The chemical processor of claim 6, further comprising a second reaction chamber in thermal contact with the second heat exchanger chamber.

8. The chemical processor of claim 5, wherein said chemical processor is selected from the group consisting of methanizer, partial oxidation reactor, water gas shift reactor, preferential oxidation reactor, fuel vaporizer and steam generator.

9. The chemical processor of claim 5, wherein said heat exchanger chamber comprises microchannels defined by microchannel walls that extend from the bottom of the heat exchanger chamber to the top.

10. An active microchannel heat exchanger for heating a working fluid, comprising:
    (a) an exothermic reaction chamber, without microchannels, having a first shell defining an exothermic reactant flow path and exhaust flow path, the first shell penetrated with at least one inlet, and an exhaust outlet;
    (b) an exhaust chamber having a second shell having top and bottom containment walls defining an exhaust flow path connected to said exhaust outlet, said second shell penetrated by an exhaust chamber outlet, the exhaust chamber having microchannels through which an exhaust flows, wherein microchannels in the exhaust chamber have microchannel walls that extend from the top containment wall to the bottom containment wall; and (c) a heat exchanger chamber in thermal contact with the exhaust chamber, said heat exchanger chamber having a third shell defining a working fluid flow path, said third shell penetrated by a working fluid inlet and a working fluid outlet through which a working fluid flows; and (d) wherein said heat exchanger chamber is in thermal contact with the exhaust chamber such that, during operation, heat from the exothermic reaction chamber is convected by an exothermic reaction exhaust through the exhaust chamber and by conduction through the containment wall to the working fluid in the heat exchanger chamber thereby raising a temperature of the working fluid; and (e) a porous material disposed within the exothermic reaction chamber wherein said porous material fills the exothermic reaction chamber from the top to the bottom of said exothermic reaction chamber.

11. The active microchannel heat exchanger of claim 10, wherein said heat exchanger chamber comprises microchannels defined by microchannel walls that extend from the bottom of the heat exchanger chamber to the top.

12. An active microchannel heat exchanger for heating a working fluid, comprising:

(a) an exothermic reaction chamber having a first shell defining an exothermic reactant flow path and exhaust flow path, the first shell penetrated with at least one inlet, and an exhaust outlet;

(b) an exhaust chamber having a second shell having top and bottom containment walls defining an exhaust flow path connected to said exhaust outlet, said second shell penetrated by an exhaust chamber outlet, the exhaust chamber having microchannels through which an exhaust flows, wherein microchannels in the exhaust chamber have microchannel walls that extend from the top containment wall to the bottom containment wall; and (c) a heat exchanger chamber in thermal contact with the exhaust chamber, said heat exchanger chamber having a third shell defining a working fluid flow path, said third shell penetrated by a working fluid inlet and a working fluid outlet through which a working fluid flows; and (d) a porous material within said exothermic reaction chamber; wherein said porous material fills the exothermic reaction chamber from the top to the bottom of said exothermic reaction chamber and wherein said heat exchanger chamber is in thermal contact with the exhaust chamber such that, during operation, heat from the exothermic reaction chamber is convected by an exothermic reaction exhaust through the exhaust chamber and by conduction through the containment wall to the working fluid in the heat exchanger chamber thereby raising a temperature of the working fluid.

13. The active microchannel heat exchanger as recited in claim 12, wherein said heat exchanger chamber has microchannels therein through which the working fluid flows.

14. The active microchannel heat exchanger as recited in claim 13, wherein said at least one inlet comprises a heating fuel inlet and an oxidizer inlet.

15. The active microchannel heat exchanger as recited in claim 14, wherein said working fluid outlet is connected to a fuel cell power system.

16. The active microchannel heat exchanger of claim 13 wherein the exothermic reaction chamber is without microchannels.

17. The active microchannel heat exchanger of claim 16 wherein said heat exchanger chamber comprises microchannels defined by microchannel walls that extend from the bottom of the heat exchanger chamber to the top.

18. The active microchannel heat exchanger as recited in claim 12, wherein said porous material comprises a catalyst.

19. The active microchannel heat exchanger as recited in claim 18, wherein said catalyst is a metal selected from the group consisting of palladium, gold, silver, platinum, ruthenium, rhodium, rhenium, indium, nickel, tin, copper, zirconium and combinations thereof.

20. The active microchannel heat exchanger as recited in claim 12, wherein said first shell is rectangular having a high aspect ratio having a top and bottom of large surface area and sides of small surface area, wherein the sides are penetrated with the at least one inlet.

21. The active microchannel heat exchanger as recited in claim 20, wherein said second shell is rectangular having a second high aspect ratio having a second top and a second bottom of large surface area and second sides of small surface area and penetrated by the exhaust outlet, wherein said second top is in contact with a fraction of a first exterior surface.

22. The active microchannel heat exchanger as recited in claim 21, wherein said third shell is rectangular having a third high aspect ratio having a third top and a third bottom of large surface area and third sides of small surface area, futher having second microchannel walls, wherein a third exterior surface is also the second bottom.

23. The active microchannel heat exchanger as recited in claim 12, wherein said exothermic reaction chamber and said exhaust chamber are formed in (a) a single shell.

24. The active microchannel heat exchanger as recited in claim 12, wherein said porous material comprises a monolithic porous ceramic material.

25. The active microchannel heat exchanger as recited in claim 24, wherein said monolithic porous ceramic material is selected from the group consisting of alumina, zirconia, titania, silica, and magnesium oxide.

26. The active microchannel heat exchanger as recited in claim 12, wherein said porous material has a pore size distribution of 0.001 to 10 micrometers.

27. The active microchannel heat exchanger as recited in claim 12, wherein said porous material comprises a metal selected from the group consisting of aluminum, stainless steel, copper, nickel and nickel based alloys.

28. The active microchannel heat exchanger as recited in claim 12, wherein said active microchannel heat exchanger is a vaporizer, partial oxidation reactor, a water gas shift reactor, and a preferential oxidation reactor.

29. The active microchannel heat exchanger as recited in claim 12, having a plurality of said exothermic reaction chamber on an exothermic reaction plate.

30. The active microchannel heat exchanger as recited in claim 29, further having a plurality of said exhaust chamber on a first side of a heat exchanger plate, and a plurality of said heat exchanger chamber on a second side of the heat exchanger plate.

31. The active microchannel heat exchanger as recited in claim 30, further comprising a control plate with a plurality of valves in fluid communication with the plurality of the exothermic reaction chambers.

32. The active microchannel heat exchanger as recited in claim 12, wherein the heat exchanger chamber is a second reaction chamber without microchannels, and wherein, during operation, heat from said exothermic reaction chamber drives an endothermic reaction in said second reaction chamber.

33. The active microchannel heat exchanger as recited in claim 32, further comprising a second heat exchanger chamber in thermal contact with the second reaction chamber.

34. An active microchannel heat exchanger for heating a working fluid, comprising:
   (a) an exothermic reaction chamber having a first shell defining an exothermic reactant flow path and exhaust flow path, the first shell penetrated with at least one inlet, and an exhaust outlet;
   (b) an exhaust chamber having a second shell having top and bottom containment walls defining an exhaust flow path connected to said exhaust outlet, said second shell penetrated by an exhaust chamber outlet, the exhaust chamber having microchannels through which an exhaust flows, wherein microchannels in the exhaust chamber have microchannel walls that extend from the top containment wall to the bottom containment wall; and
   (c) a heat exchanger chamber in thermal contact with the exhaust chamber, said heat exchanger chamber having a third shell defining a working fluid flow path, said third shell penetrated by a working fluid inlet and a working fluid outlet through which a working fluid flows; and
   (d) a porous material within said exothermic reaction chamber; wherein said porous material fills the exothermic reaction chamber from the top to the bottom of said exothermic reaction chamber and wherein
   said working fluid outlet is connected to said at least one inlet and provides a fluid communication between the heat exchanger chamber and the exothermic reaction chamber.

35. The active microchannel heat exchanger as recited in claim 34, further comprising a second heat exchanger chamber in thermal contact with the heat exchanger chamber.

36. The active microchannel heat exchanger as recited in claim 35, further comprising a second reaction chamber in thermal contact with the second heat exchanger chamber and connected to the exothermic reaction chamber and receiving the exhaust therefrom.

37. The active microchannel heat exchanger of claim 27 wherein the porous metal is supplemented with a catalyst coating.

* * * * *